United States Patent
Auerbach et al.

(10) Patent No.: US 8,024,515 B2
(45) Date of Patent: Sep. 20, 2011

(54) NON-VOLATILE CACHE IN DISK DRIVE EMULATION

(75) Inventors: Daniel J. Auerbach, San Jose, CA (US); Spencer W. Ng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 584 days.

(21) Appl. No.: 11/952,534

(22) Filed: Dec. 7, 2007

(65) Prior Publication Data

US 2009/0150614 A1 Jun. 11, 2009

(51) Int. Cl.
*G06F 13/00* (2006.01)

(52) U.S. Cl. ................. 711/113; 711/E12.019

(58) Field of Classification Search .......... None
See application file for complete search history.

(56) References Cited

U.S. PATENT DOCUMENTS

| | | | |
|---|---|---|---|
| 5,903,917 A * | 5/1999 | Douceur et al. | 711/201 |
| 7,080,200 B2 | 7/2006 | Hassner et al. | |
| 7,610,445 B1 * | 10/2009 | Manus et al. | 711/113 |
| 2005/0246487 A1 | 11/2005 | Ergan et al. | |

OTHER PUBLICATIONS

P. Biswas, K.K. Ramakrishnan, D. Towsley, "Trace Driven Analysis of Write Caching Policies for Disks", ACM SIGMETRICS conference, ACM, May 1993.*

* cited by examiner

*Primary Examiner* — Pierre-Michel Bataille
*Assistant Examiner* — John P Fishburn
(74) *Attorney, Agent, or Firm* — Patterson & Sheridan, LLP

(57) ABSTRACT

A method and apparatus for deferring media writes for emulation drives are provided. By deferring media writes using non-volatile storage, the performance penalty associated with RMW operations may be minimized. Deferring writes may allow the RMW operations to be done while the disk drive is idle. Further, deferring writes may also allow data blocks to be accumulated over time, allowing a full (4K) disk drive block size to be written with a simple write operation, thus making a RMW unnecessary.

17 Claims, 4 Drawing Sheets

NON-VOLATILE CACHE IN DISK DRIVE EMULATION

BACKGROUND OF THE INVENTION

1. Field of the Invention

Embodiments of the present invention generally relate to computer systems, and more particularly, to improving the performance of computer systems as the industry transitions to hard disk drives formatted with larger memory blocks.

2. Description of the Related Art

Modern hard disk drives (HDD) internally use a standard block size of 512 data bytes (0.5 KB). This block size has been in use for over 20 years. As a result, 0.5 KB block size is pervasive in all of today's system software, including operating systems and application programs.

Innovations in the disk drive industry have led to the recording density of disk drives increasing dramatically. Naturally, this equates to a decrease in the physical area of the disk required to contain a standard block of data. However, the size of physical defects (e.g. contaminates and scratches) has not decreased in any significant way. Consequently, when physical defects occur within a block, a greater percentage of the data within the block becomes corrupted when compared to less dense drives.

To overcome this problem, a more powerful error correction code (ECC) method is necessary. However, a more powerful ECC necessitates more redundancy, which calls for a greater percentage of a disk's space to be used for ECC, and results in less space for a user's data. One way to mitigate a decrease in data formatting efficiency is to employ the more powerful ECC on a larger standard block. By implementing a larger standard block, the cost of additional redundancy is amortized over additional bytes.

An additional issue to examine is the need of an ECC to have a substantial portion of the data block error free. Despite the power and sophistication of an ECC, error correction requires a significant portion of the data block to be correct. Accordingly, the denser the recording, the greater the number of bytes a given defect may span, and the larger the data block must be to continue to accommodate error correction.

The ideal solution to working with larger standard memory blocks would be for all the operating systems, firmware, and applications, in use today to be changed to work with larger blocks, for example 4 KB memory blocks. In fact, some operating systems, such as Windows Vista, will soon support 4 KB standard blocks. However, due to the number of applications in use today, it is likely to take many years for all such programs to be converted to a 4 KB block size.

Another possible solution to working with larger standard memory blocks is for the disk drive to internally use a larger block size, such as 4 KB, but externally interface with the host using the current 0.5 KB block size. To do this the drive would have to handle the conversion from 0.5 KB logical block size to its internal 4 KB physical block size. The conversion from 0.5 KB to 4 KB may involve mapping eight 0.5 KB logical blocks to one 4 KB physical block. This technique is known as emulation and allows 0.5 KB legacy software to run on 4 KB internal disk drives.

Unfortunately, writing the 0.5 KB blocks to the hard drive in emulation mode requires a read modify write (RMW) operation. An entire 4 KB block is read out of the disk drive, modified with the 0.5 KB write data, and written back to the disk drive. These operations are costly from a performance standpoint and reduce the amount of time a disk can spin down.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention generally provides techniques and apparatus for deferring writes to hard disk drives (HDD) with larger standard block sizes (e.g. 2 KB or 4 KB) in an emulation environment by utilizing non-volatile memory. The non-volatile memory may be used to temporarily store (cache) data while waiting for a HDD to become available, during periods the system is powered down, while acquiring sufficient data to perform a simple write, or any other instance in which it is desirable to defer writing the data to a HDD.

An Example Environment

Figure 1:
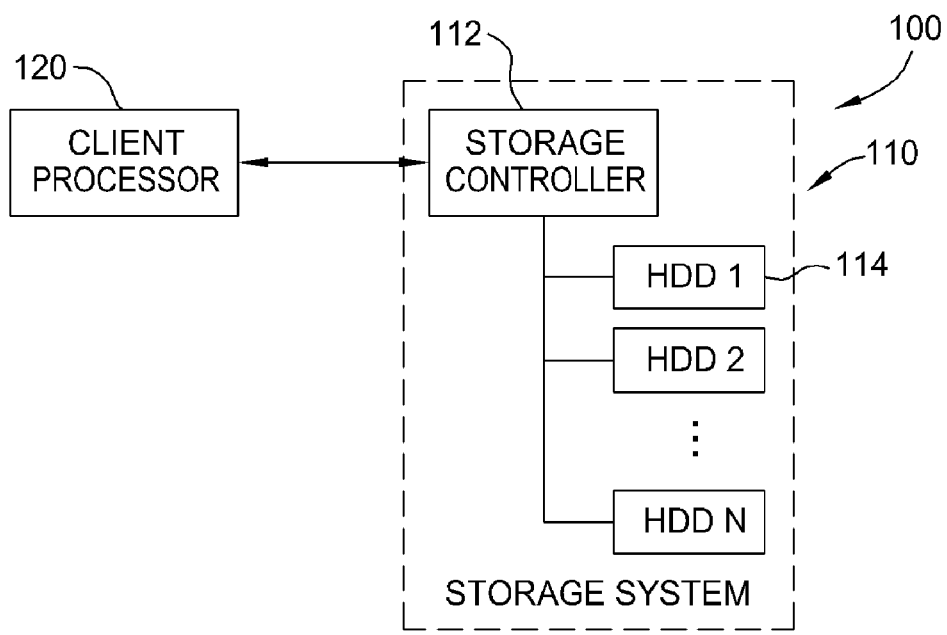
FIG. 1 illustrates an example system in which embodiments of the present invention may be utilized.

FIG. 1 illustrates an example system 100 in which embodiments of the present invention may be utilized to defer writing data from one or more client processors 120 to one or more HDDs in a storage system 110. The system 110 includes a storage controller 112, which communicates between one or more client processors 120 to store and retrieve data from a plurality of HDDs 114.

While FIG. 1 shows a storage system with a plurality of HDDs, those skilled in the art will recognize that the techniques presented herein may be utilized in a variety of devices and applications. Such devices may include PCs, laptops, and handheld electronic devices.

Figure 2:
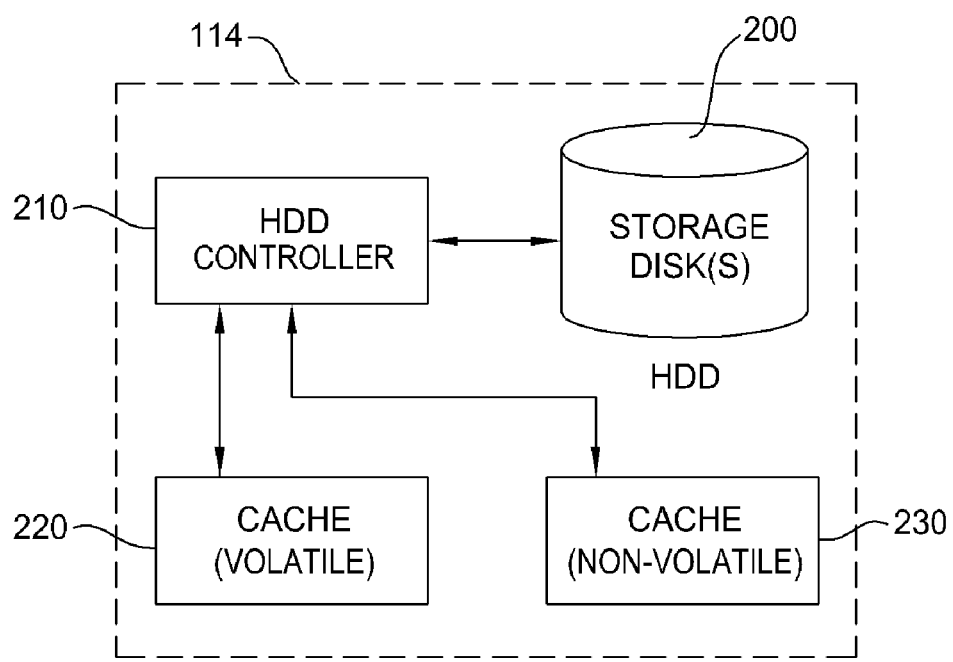
FIG. 2 illustrates a block diagram of a hard disk drive.

FIG. 2 illustrates a block diagram of a hard disk drive (HDD) 114 in accordance with embodiments of the present invention. The HDD includes storage disks 200, a HDD controller 210, a volatile cache 220, and a non-volatile cache 230. As will be demonstrated below the non-volatile cache 230 may allow the deferring of write data.

The storage disks 200 may include a non-volatile storage medium such as one or more platters, with each platter containing small magnetic regions. Each magnetic region represents a single bit, which are grouped together into logical blocks, which are traditionally 0.5 KB in size. In some embodiments, the storage disks 200 may store 4 KB blocks. In such embodiments, the HDD controller 210 may perform a plurality of emulation tasks which may be necessary in converting data from traditional 0.5 KB logical blocks to 4 KB blocks. These emulation tasks may include, among other things, caching 0.5 KB blocks of data until 8 blocks can be written to a single 4 KB block (i.e. simple writes) or caching 0.5 KB blocks of data while performing read-modify-write (RMW) operations.

Volatile memory 220 may be used in a conventional manner to cache data and may include any volatile memory known in the art. Examples of volatile memory that may be used include dynamic random access memory (DRAM), synchronous DRAM (SDRAM), single data rate SDRAM (SDR SDRAM), and double data rate SDRAM (DDR SDRAM).

Non-volatile memory 230 may also be used to cache data and may include any memory that retains its data when power is removed and stores data in such a way as to facilitate said data being erased and new data being written and stored.

Figure 3:
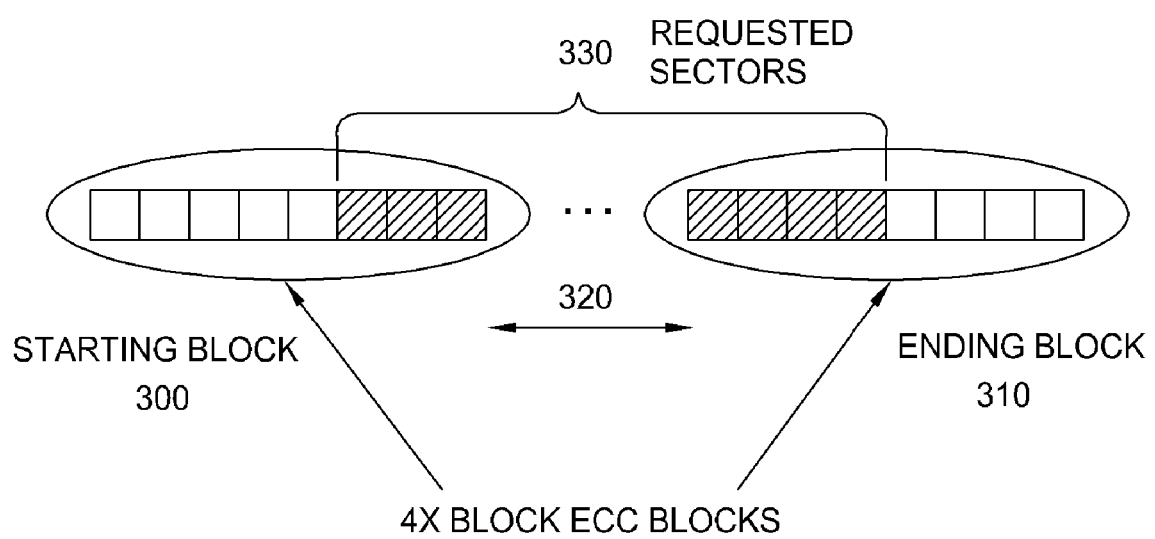
FIG. 3 illustrates an example wherein requested data does not align with 4 KB memory blocks.

FIG. 3 illustrates an example wherein requested data may start at a first 4 KB block 300, end at a second 4 KB block 310, and span a variable number of additional 4 KB blocks 320. In many instances, the data requested in a write operation 330 may not align with the start or end of a 4 KB block, only partially filling the starting and/or ending blocks 300, 310. In such instances, the HDD controller 210 may defer writing the data to the storage disks 200 by caching the data requested in volatile memory 220 or non-volatile memory 230 before performing a RMW operation. In other instances, the data requested in a write operation may not fill an entire 4 KB block. In such instances, the HDD controller 210 may defer writing the data to the storage disks 200 by caching the data requested in volatile memory 220 or non-volatile memory 230 until a full block of data is ready to be written by means of a simple write. If a full block of data is not ready to be written, or is not ready within a predetermined period of time, a RMW operation may be performed.

In some instances, the HDD controller 210 may defer writing the data to the storage disks 200 by caching the data requested in volatile memory 220 or non-volatile memory 230 because the storage disks are currently unavailable. In other embodiments the HDD controller 210 may defer writing the data to the storage disks 200 by caching the data requested in volatile memory 220 or non-volatile memory 230 to save power by allowing the disks to spin down for longer periods of time.

There are instances in which it may be undesirable to cache write data to volatile memory 220. An example of such an instance may include an application in which the possibility of unexpectedly losing write data (e.g. unexpected power failure) could be costly. To prevent the unexpected loss of write data, the application may disable volatile cache-based RMW deferment resulting in decreased performance due to the extra time needed to perform RMW operations associated with emulation on storage disks with 4K data blocks.

Implementing non-volatile memory 230 mitigates this problem since non-volatile memory retains its data across power cycles. Deferring write operations by caching to non-volatile memory protects valuable write data, while increasing performance time and storage efficiency.

Further, non-volatile memory typically cost less than traditional DRAM cache. Accordingly, the storage capacity per dollar of non-volatile memory may be significantly greater than that of traditional DRAM cache. This may allow the HDD controller 210 to cache significantly more data between write operations and lead to significant power savings and more time efficient write operations.

Figure 4:
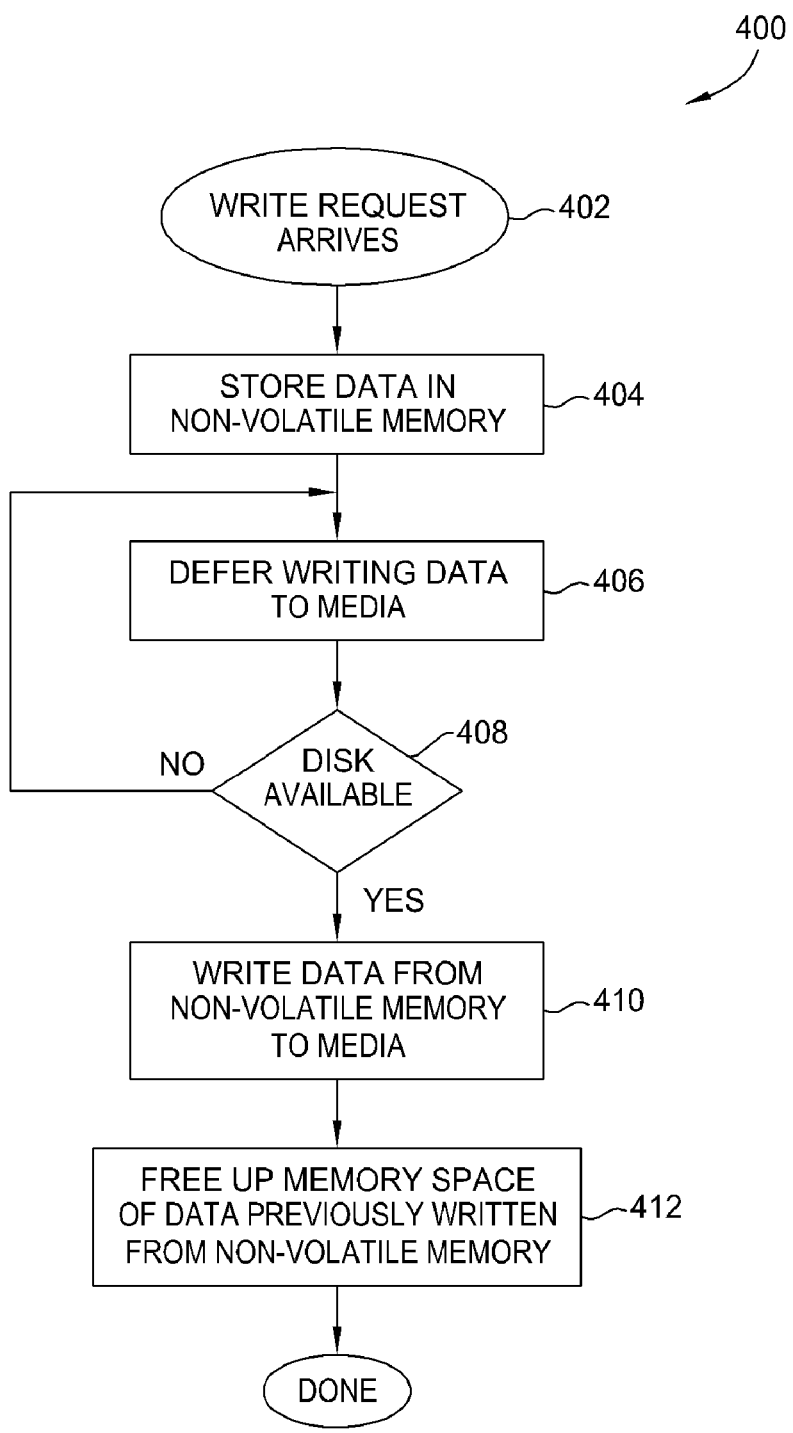
FIG. 4 illustrates example operations for increasing writing efficiency by utilizing non-volatile memory in the writing process.

FIG. 4 illustrates example operations 400 for increasing writing efficiency by utilizing non-volatile memory in the writing process. The operations begin at 402 when the HDD controller 210 receives a write request. At 404, the data to be written is cached in non-volatile memory 230. At 406, writing the data to the storage disks 200 is deferred. Reasons to defer writing the data to the storage disks may include the storage disks 200 being unavailable, said data not filling a 4K memory block, and said data not aligning with 4 KB memory block boundaries.

At 408, the HDD controller 210 performs an evaluation of the availability of the storage disks 200. If the disks are not available, step 406 is repeated until the storage disks 200 are available. Once the storage disks 200 are available, the data is written from non-volatile memory to the storage disks, at 410. At 412, the data from the previous write is marked as free in non-volatile memory. Data marked as free may stay in the non-volatile memory until evicted by new write data requiring the space. While data is marked free but before the data is evicted, the data is available for read operations, saving the controller from having to retrieve the data from the storage disks 200.

In some embodiments, the event to trigger a write may not simply be the availability of the storage disks 200. An example of an alternate write triggering event may include approaching or meeting the non-volatile memory storage capacity. If cached write data was allowed to exceed the capacity of the non-volatile memory, the security of write data from unexpected data loss might be compromised. To prevent compromising the security of write data, the HDD controller 210 may interrupt the current operations of storage disks 200 and perform a write upon the occurrence of a write triggering event. Other examples of write triggering events may include time-based triggers, power-on operations, or the occurrence of any other event the HDD controller determines is significant.

While being kept in non-volatile memory, the 0.5 KB data blocks to be written may completely fill one or more 4 KB blocks, in which case a simple write operation may be performed. Conversely, for partially filled blocks, a RMW operation may be performed. Simple write operations are more time efficient than RMW operations, which requires at least one additional revolution of a storage disk. Accordingly, performance of the system is enhanced when the number of simple write operations is maximized and the number of RMW operations is minimized.

Figure 5:
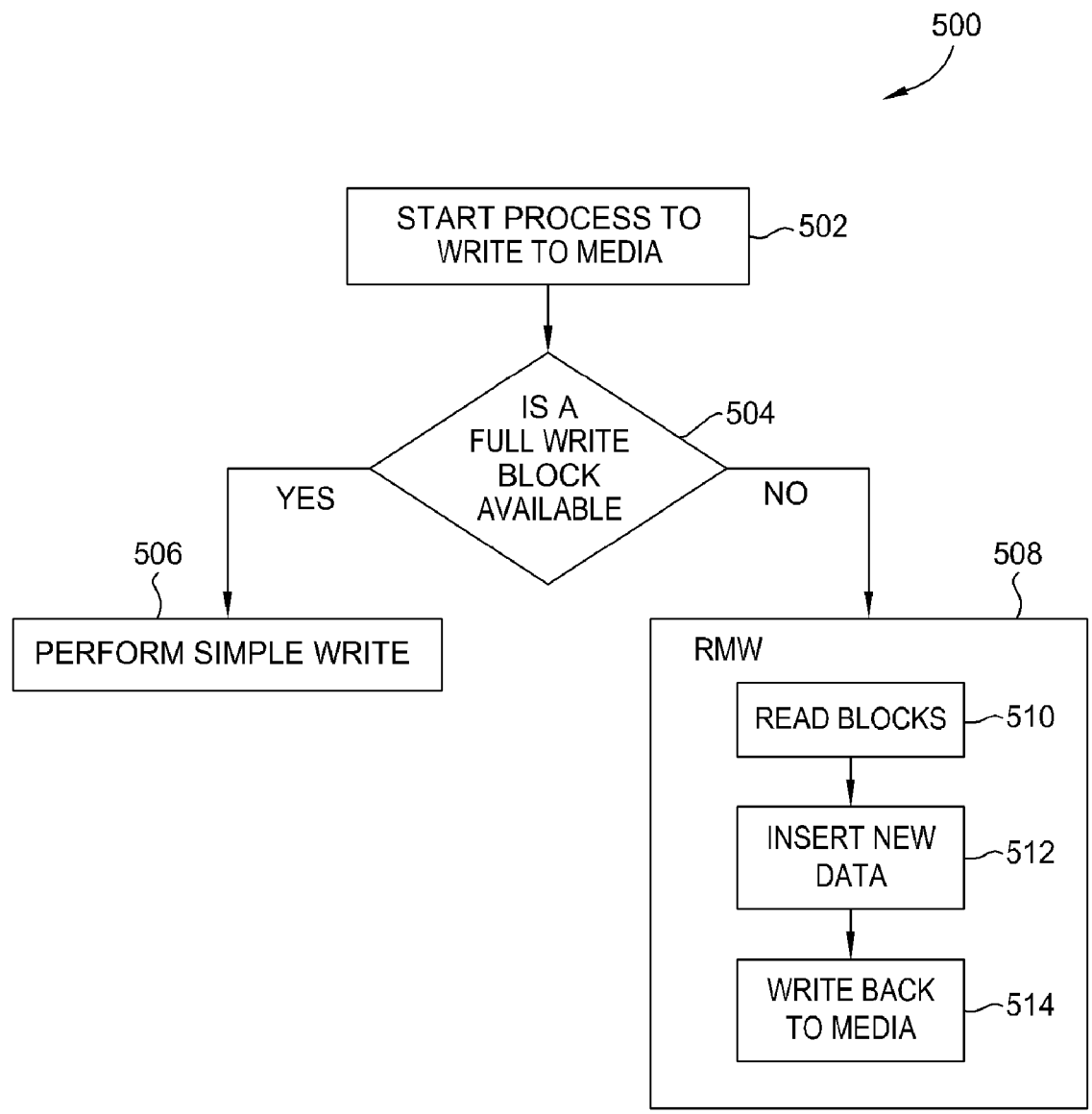
FIG. 5 illustrates example operations 500 for writing to media with 4 KB data blocks.

FIG. 5 illustrates example operations for writing to media with 4 KB data blocks, pursuant to 410 of FIG. 4. The operations begin at 502 when the HDD controller 210 starts the write to media process. At 504, the HDD controller, determines if there is sufficient data to write a full, 4 KB data block. If there is sufficient data to write a full, 4 KB data block, then a simple write is performed at 506. If there is insufficient data to write a full, 4 KB data block, then a read-modify-write RMW operation is performed at 508. A RMW operation includes reading the contents of the block(s) to which the data is to be written 510, modifying the contents of the block(s) by inserting the new data 512, and writing the block(s) of data back 514 to the storage disks 200.

CONCLUSION

By using non-volatile memory to defer media writes for emulation drives, the performance penalty associated with RMW operations may be minimized. Deferring writes may allow the RMW operations to be done while the disk drive is idle. Further, deferring writes may also allow data blocks to be accumulated over time, forming a full (4K) disk drive block to be written with a simple write operation, thus making a RMW unnecessary.

While the foregoing is directed to embodiments of the present invention, other and further embodiments of the invention may be devised without departing from the basic scope thereof, and the scope thereof is determined by the claims that follow.

The invention claimed is:

1. A method for disk drive emulation, comprising:
    receiving a request to write data to a storage medium of a hard drive, wherein the request contains write data comprising one or more blocks formatted based on a first block size while the storage medium comprises a plurality of blocks formatted based on a second block size larger than the first block size;
    caching the write data in non-volatile memory on the hard drive;
    upon determining that the write data does not align with a start or an end of a block in the storage medium, deferring writing the write data to the storage medium;
    combining the write data with different write data received via additional write data requests; and
    upon detecting that the write data aligns with both a start and an end of a block in the storage medium, writing the write data from the non-volatile memory to the storage medium.

2. The method of claim 1, wherein writing the write data from the non-volatile memory to the hard drive storage medium comprises, performing a read-modify-write by:
    reading a second block size of data from the storage medium;
    modifying the data read from the storage medium to include the write data; and
    writing the modified data back to the storage medium.

3. The method of claim 1, further comprising:
    maintaining the write data in the non volatile storage after writing the write data to the storage medium; and
    marking the space occupied by the write data as free.

4. The method of claim 1, wherein the hard drive storage medium is formatted based on a hard drive block size of 4 KB.

5. The method of claim 1, comprising deferring writing the write data to the storage medium across one or more power cycles.

6. The method of claim 5, further comprising:
    detecting that there is write data in the non volatile memory after a power on reset; and
    in response, writing the write data to the storage medium without receiving another write request to write the write data to the storage medium.

7. A hard disk drive (HDD) controller configured to:
    receive a request to write data to a storage medium of a hard drive, wherein the request contains write data comprising one or more blocks formatted based on a first block size while the storage medium comprises a plurality of blocks formatted based on a second block size larger than the first block size;
    cache the write data in non-volatile memory on the hard drive;
    upon determining that the write data does not align with a start or an end of a block in the storage medium, defer writing the write data to the storage medium;
    combine the write data with different write data received via additional write data requests; and
    upon detecting that the write data aligns with both a start and an end of a block in the storage medium, write the write data from the non-volatile memory to the storage medium.

8. The HDD controller of claim 7, wherein the controller is configured to write the write data from the non-volatile memory to the hard drive storage medium, wherein the write comprises, performing a read-modify-write by:
    reading a second block size of data from the storage medium;
    modifying the data read from the storage medium to include the write data; and
    writing the modified data back to the storage medium.

9. The HDD controller of claim 7, wherein the controller is further configured to:
    maintain the write data in the non volatile storage after writing the write data to the storage medium; and
    mark the space occupied by the write data as free.

10. The HDD controller of claim 7, wherein the hard drive storage medium is formatted based on a hard drive block size of 4 KB.

11. The HDD controller of claim 7, wherein the HDD controller may defer writing the write data to the storage medium across one or more power cycles.

12. The HDD controller of claim 11, wherein the controller is further configured to:
    detect if there is write data in the non volatile memory after a power on reset; and
    in response, write the write data to the storage medium without receiving another write request to write the write data to the storage medium.

13. A hard disk drive, comprising:
    at least one long-term storage medium;
    one or more segments of non-volatile memory; and
    a controller configured to:
        receive a request to write data to a storage medium of a hard drive, wherein the request contains write data comprising one or more blocks formatted based on a first block size while the storage medium comprises a plurality of blocks formatted based on a second block size larger than the first block size;
        cache the write data in non-volatile memory on the hard drive;
        upon determining that the write data does not align with a start or an end of a block in the storage medium, defer writing the write data to the storage medium;
        combine the write data with different write data received via additional write data requests; and
        upon detecting that the write data aligns with both a start and an end of a block in the storage medium, write the write data from the non-volatile memory to the storage medium.

14. The hard disk drive of claim 13, wherein the controller is further configured to:
    maintain the write data in the non volatile storage after writing the write data to the storage medium; and
    mark the space occupied by the write data as free.

15. The hard disk drive of claim 13, wherein the hard drive storage medium is formatted based on a hard drive block size of 4 KB.

16. The hard disk drive of claim 13, wherein the HDD controller may defer performance of write operations over a power cycle.

17. The hard drive disk of claim 13, wherein the controller is further configured to:
    detect if there is write data in the non volatile memory after a power on reset; and
    in response, write the write data to the storage medium without receiving another write request to write the write data to the storage medium.

* * * * *